Patented Mar. 10, 1953

2,631,139

UNITED STATES PATENT OFFICE 2,631,139

DIOLEFIN COPOLYMER RUBBER PLASTICIZED WITH TOUGH STYRENE-ISOBUTYLENE COPOLYMERS

Marvin H. Mahan, Elizabeth, N. J., assignor to Standard Oil Development Company, a corporation of Delaware No Drawing. Application December 4, 1945, Serial No. 632,802

9 Claims. (Cl. 260—45.5)

This invention comprises novel compositions containing a synthetic diolefin rubber and a copolymer of an olefin and a polymerizable unsaturated hydrocarbon containing a cyclic nucleus.

The term "diolefin rubber" as used herein is intended to mean a synthetic rubber containing more than 50% of a diolefin such as butadiene or isoprene. The synthetic rubber may consist entirely of such diolefin, but preferably contains a minor amount, such as 10–40% or so, of olefinic modifying materials such as styrene or acrylonitrile. Several synthetic rubbers of this type are already well known, for instance one of the so-called GR–S type which generally contains about 75% of butadiene and 25% of styrene, and another one commonly known as GR–A type which generally contains butadiene together with about 15–35% of acrylonitrile. These synthetic rubbers may be prepared by any method known to the art such as by mass polymerization or emulsion polymerization.

It is known that such synthetic rubbers, although vulcanizable like natural rubber, are not as plastic and workable as might be desired, and when cured, do not possess as satisfactory properties in every respect as might be desired. One object of the present invention is to overcome such difficulties by compounding with such synthetic rubbers a high molecular weight synthetic hydrocarbon plastic which very greatly improves the handling of such synthetic rubbers on the mill, without substantially impairing, and in some cases actually improving the physical properties of the synthetic rubber either with or without subsequent curing.

The synthetic hydrocarbon copolymer plastic referred to above and which is compounded with such synthetic rubbers in accordance with this invention, may for instance be a solid copolymer of styrene and isobutylene having certain desired characteristics.

It is known that copolymers of styrene and isobutylene may be made by copolymerizing said reactants at a temperature below about 0° C., for instance at −10° C., −50° C., −80° C., etc., in the presence of an active halide polymerization catalyst such as boron fluoride or aluminum chloride, as described in Patent 2,274,749.

Instead of isobutylene other aliphatic olefins or alkenes may be used, preferably having more than 2 carbon atoms and preferably iso-olefins having 4 to 8 carbon atoms, such as isopentene (methyl-2 butene-1) or a pentene obtained by dehydration of secondary amyl alcohol.

Instead of styrene, other polymerizable hydrocarbons containing a cyclic nucleus may be used such as alphamethyl styrene, paramethyl styrene, alphamethyl paramethyl styrene, indene, terpenes, etc.

For convenience and brevity the above-described copolymer of a cyclic polymerizable material and an olefin or alkene will be referred to as a cycalkene copolymer or more simply as a cycalkene. The specific type of copolymer made from styrene and isobutylene will similarly be referred to as simply stybutene. The invention will be illustrated as applied particularly to stybutene, although it is not to be limited specifically thereto.

The copolymerization is effected by mixing the two reactants, with or without a mutual solvent, such as butane, methyl chloride, refined naphtha, etc., and then after cooling the reactants to the desired low temperature, adding an active halide catalyst such as boron fluoride, or activated boron fluoride catalyst (.1% ether added), aluminum chloride, titanium tetrachloride, aluminum alkoxide-aluminum chloride complex- $$(AlCl_3.Al(OC_2H_5)_3)$$

and the like. If desired, such catalyst may be dissolved in a solvent such as carbon disulfide, a low molecular weight sulfur-free saturated hydrocarbon, a lower alkyl halide, e. g. methyl chloride or ethyl chloride or a mixture of methyl chloride with butane, at or below the boiling point of the catalyst solvent, and then the catalyst solution cooled down, filtered and added to the reaction mixture. Alternative catalysts include: $AlCl_3.AlCl_2OH$, $AlBr_3.AlBr_2OH$, $AlBr_2Cl.AlOCl$, $AlBrCl_2.AlOBr$, $TiCl_4.AlCl_2OH$, $TiOCl_2.TiCl_4$, $AlBr_3.Br_2.CS_2$, $BF_3$. isopropyl alcohol, $BF_3$ solution in ethylene, activated $BF_3$ catalyst in ethylene solution, activated $BF_3$ catalyst in methyl chloride solution. Volatile solvents or diluents, e. g. propane, ethane, ethylene, methyl chloride, carbon dioxide (liquid or solid), etc. may also serve as internal or external refrigerants to carry off the liberated heat of polymerization. After completion of the copolymerization, residual catalyst is killed with an alcohol, for example, isopropyl alcohol, and excess catalyst is removed by washing the product with water and preferably also with dilute hydrochloric acid.

The resulting solid copolymer may range in properties depending upon the proportions of cyclic reactant in the feed. The proportions in which these reactants, e. g. styrene and isobutylene, have actually combined during copolymerization may be determined by interpolation of a carbon-hydrogen analysis between the limits. For instance:

|  | Carbon | Hydrogen |
|---|---|---|
|  | Percent | Percent |
| Pure styrene | 92.3 | 7.7 |
| Pure isobutylene | 85.7 | 14.3 |

Generally the molecular weight of the product will range from about 800 upwards, for instance, to 3,000, 5,000, 25,000, 100,000 or much higher, the larger molecular weights being obtained at the lower polymerization temperatures. These copolymers are substantially completely saturated in respect to hydrogen, since during the process of polymerization the olefinic linkage is converted into a saturated linkage for each molecule added to the chain except the last molecule, thus leaving only one double bond which is insignificant in effect due to the largeness of the molecule.

It has already been suggested that such stybutene copolymers, for instance made with 10% styrene at −45° C., or with 33% styrene at −10° C., could be used as softeners or plasticizers for rubber or several synthetic rubbers, but the resulting compositions have the disadvantages that they develop loss in strength and excessive tackiness when used in relatively large proportions.

For compounding with the synthetic diolefin rubber according to the present invention only stybutenes or other cycalkene copolymers are used which are made at a temperature between the approximate limits of −50° C. and −103° C., the boiling point of liquid ethylene, and which have about 30–75%, preferably about 40–60%, of combined styrene or other cyclic constituents in the copolymer, which accordingly will then have an intrinsic viscosity greater than 0.5 and preferably 0.6 to 3.0. They are tough, flexible, thermoplastic solids with softening points ranging to 90° C. and higher, the higher softening point being obtained with the higher content of cyclic constituents; those of the lower content of cyclic constituents are the more flexible and slightly softer in texture. It is preferred to use a stybutene made in methyl chloride solution, using about 1–4 volumes of methyl chloride per volume of active feed.

The proportion in which the synthetic diolefin rubber and the cycalkene copolymer are to be compounded according to this invention, will vary over a wide range such as 1 to 99% of either ingredient depending upon the particular purposes to be accomplished. The preferred proportions are about 10 to 90% of the cycalkene copolymer to 90–10% of the synthetic diolefin rubber. To illustrate how the proportions to be used will vary according to the purpose, the following suggestions are given. For instance, a synthetic rubber composed of about 25–35% of acrylonitrile and about 75–65% of butadiene, commonly referred to as GR-A, requires an excessive amount of mill break-down or chemical treatment to make it processable. In its unmasticated or untreated state, it is sufficiently tough so that it will not compound readily with mixing ingredients such as fillers, plasticizers, accelerators, etc. Characteristically, on the mill it does not band, and in pure gum compositions it can not be calendered or extruded. However, incorporation of 20% of a styrene-isobutylene copolymer having a combined styrene content of about 50–60% makes the GR-A handle very easily on the mill and facilitates the incorporation of fillers, accelerators and other additives to make a homogeneous composition with a minimum of mechanical working. When the proportion of stybutene is increased from 20% to 50%, the processing of the GR-A composition is even further improved, and the material may readily be calendered on to cloth, paper and other materials.

For plasticizing GR-S, the synthetic rubber similar to GR-A except containing styrene instead of acrylonitrile, which is not quite as tough and difficult to handle as the GR-A but is still more difficult than natural rubber, it is found that the incorporation of even 10% of a stybutene copolymer of the class preferred for the purposes of this invention, will greatly improve the handling of the GR-S on the mill. Much larger amounts may also be used without developing the excessive tackiness and loss of strength which results from use of large amounts of a viscous liquid or soft thermoplastic solid stybutene having a low intrinsic viscosity, e. g. 0.1 to 0.4, as made with 10–50% styrene at −10 to −45° C., or a soft, tacky, but slightly elastic one having a higher intrinsic viscosity, e. g. 0.5 to 1.0 or more, as made at temperatures below −50° C. but with less than 30% styrene, e. g. 5 to 20% or so, as these latter stybutenes are not truly compatible with GR-A synthetic rubber.

On the other hand if relatively small proportions of a synthetic diolefin rubber are added to the resinous cycalkene copolymer such as the stybutene of the type specified for this invention, several different advantages result. One is that although the stybutene per se can not be vulcanized, a mixture thereof with some GR-S or GR-A or other synthetic diolefin rubber can then be vulcanized. For such purposes about 5–40% or so of the synthetic rubber will generally suffice. Another advantage is that these synthetic rubbers impart to the cycalkene copolymer a higher softening point and a greater amount of flexibility and elasticity than they normally possess per se and they reduce the tendency of the stybutene to "strike through" paper or cloth coated therewith. A still further advantage inherent particularly in the GR-A type of synthetic rubber, due to its content of acrylonitrile, is an improvement in the oil-resistance, both in regard to fatty oils as well as hydrocarbon oils and solvents, and furthermore, as little as 10% of a GR-A containing about 25% or so of acrylonitrile effects a substantial reduction in the slight stickiness or tackiness of the stybutene on the hot mill. This is important of course, since the cycalkene copolymers are thermoplastic in nature.

An additional advantage, accruing from the use of the substantially saturated cycalkene copolymer with any of these synthetic diolefin rubbers, is an improvement in the chemical resistance of the finished product, due to a reduction in the relative amount of unsaturation in the product, and due to an apparent protection of the synthetic rubber molecules against oxidation and the harmful effects of sunlight and other deteriorating influences.

In carrying out the invention, several different procedures may be used. For instance, if a minor proportion of stybutene is to be incorporated with a major proportion of synthetic rubber, it is convenient to start working the latter on a conventional rubber mill heated to the desired temperature in the range of about 100 to 300° F., preferably about 150–250° F., and then gradually add the stybutene either in the form of a thin self-sustaining film spread out over the width of the rubber mill rolls, or else in the form of granules which may be dispersed into the synthetic rubber as fast as it can be worked in on the mill. In any event, after all of the stybutene has been added to the synthetic rubber, the milling should be continued for a sufficient time e. g. 5–10 minutes or so, to insure a completely homogeneous mixture. Other compounding ingredients such as reclaim rubbery materials, or fillers such as zinc oxide, reinforcing agents such as carbon black, as well as the usual vulcanizing agents, accelerators, anti-oxidants, pigments etc. may be then incorporated into the batch.

On the other hand, if only a minor proportion of the synthetic rubber is to be incorporated into a major proportion of the cycalkene copolymer, then it is preferable to soften the latter either in a heated kneader or on hot rubber mill rolls, and then while the thermoplastic copolymer is being worked, the synthetic rubber may gradually be added, and the mixing continued until the composition is completely homogeneous. Other compounding ingredients may also be added if desired, as mentioned above.

In curing the compositions of this invention, temperatures to be used will depend partly upon the degree of unsaturation of the synthetic rubber and upon the proportion and the softening point of the cycalkene copolymer compounded therewith, and upon the compounding formula and accelerator used, but may range from room temperature to 400° F., and preferably should be about 250–300° F., with a curing time inversely proportional to the temperature used, and ranging from 5 minutes to 5 hours, but preferably about 20 to 40 minutes.

The object, advantages, and details of the invention will be still better understood from the following examples:

*Example 1*

A batch was compounded using the following formula:

50 parts stybutene [1]
50 parts GR–S rubber (75% butadiene and 25% styrene)
6 parts zinc oxide
1 part stearic acid
2 parts sulfur
1 part Tuads (tetramethyl thiuram disulfide)

[1] This stybutene contained about 70% combined styrene, was copolymerized at −103° C., using three volumes of methyl chloride as solvent, per volume of mixed reactants, and using aluminum chloride dissolved in methyl chloride as catalyst. It had an intrinsic viscosity of about .7.

The above ingredients were compounded on the usual laboratory rubber mill at a temperature of about 130° F. and then was cured in a golf ball mold at about 300° F. for 60 minutes. The resulting golf ball, which was quite hard, was used to play several holes of golf and on various drives carried over 200 yards. The ball was not cut or knocked out of shape and it was then placed on a concrete slab and struck several times with a five-pound sledge hammer, with the result that the ball was distorted but did not crack or break under these blows. It is thus apparent that this stybutene-GR–S rubber composition is unexpectedly resistant to cuts and abrasion and has high impact strength.

*Example 2*

Into a stybutene having a combined styrene content of about 40% and having an intrinsic viscosity of about 0.85 was milled 10% of GR–A synthetic rubber (74% butadiene and 26% acrylonitrile), using a milling temperature of about 150° F. The resultant product had a higher softening point than the stybutene per se, and did not melt or become sticky during the hot milling. Also, this modified stybutene composition was not as tacky at mill temperatures as a stybutene per se having a 40% combined styrene content.

*Example 3*

By weight, 20% of a stybutene (made at a temperature of about −103° C.) containing 60% of combined styrene and having an intrinsic viscosity of about 0.75, was milled into a GR–A synthetic rubber containing 26% of acrylonitrile using a milling temperature of about 150° F. The composition banded and worked nicely on the mill, even at temperatures above 250° F., whereas a GR–A synthetic rubber per se does not readily band at temperatures this high.

*Example 4*

Example 3 was repeated except that equal proportions of the stybutene and GR–A were used. The composition handled easily on the mill at elevated temperatures, and, on sheeting, the product made a thin self-supporting film which was nearly transparent.

*Example 5*

Example 4 was repeated except that the stybutene used contained 50% of combined styrene and 2% of zinc stearate which had been added to prevent sticking to hot steel rolls. The resulting composition was found to be perfectly compatible and homogeneous and could be calendered into an attractive self-supporting film free from holes and imperfections. It was more resistant to fatty oils and hydrocarbon solvents than a film made of the stybutene per se.

*Examples 6 and 7*

Example 5 was repeated twice except that instead of using equal proportions of the stybutene and the GR–A, in one case proportions of 25% and 75% were used, and in the other case, 75% and 25%. In both of these tests the products obtained were completely homogeneous and could be readily calendered to produce thin self-supporting film which had good oil resistance and good physical properties, including flexibility, tensile strength, etc.

*Example 8*

Example 5 was repeated again except that the stybutene used contained 60% of combined styrene together with 2% of zinc stearate. The resulting product was also found to be completely compatible and could be calendered into an attractive self-supporting film similar to those produced in Examples 5, 6 and 7.

*Example 9*

Example 8 was repeated except that instead of using a GR–A containing 26% of acrylonitrile, a GR–A was used which contained 35% of acrylonitrile. This type of synthetic rubber is tougher and processes with greater difficulty than the GR–A used in previous examples. However, it was found that this synthetic rubber of high acrylonitrile content was compatible with the stybutene and resulted in a completely homogeneous product. It was easily processable and produced a self-supporting film having good physical properties and improved oil resistance.

Attempts to mix a stybutene having a combined styrene content as high as 70% with a GR–A containing 35% of acrylonitrile, indicated that these two materials are not completely compatible, so that it is desirable to reduce either the styrene content of the stybutene or the acrylonitrile content of the GR-A.

*Example 10*

20% of a stybutene similar to that used in Examples 8 and 9 was compounded with 80% of a GR-A containing 26% of acrylonitrile, without any previous breakdown of the latter on the mill. About ten minutes milling was required to obtain a homogeneous, compatible mixture. The resultant product was found to be readily calenderable, producing a smooth, clear sheet of material. Pigment incorporation tests indicated that this mixture would accept loading readily.

*Example 11*

Example 10 was repeated except that the GR-A used contained 35% of acrylonitrile, instead of only 26%. Here again, about ten minutes milling was necessary to obtain a homogeneous, compatible mixture. The composition was also found to calender satisfactorily, giving attractive, pure gum sheets, and it could readily be compounded with loadings, plasticizers and other ingredients.

*Example 12*

90 parts by weight of a GR-S type of synthetic rubber, made of 75% butadiene and 25% styrene, and 10 parts by weight of a stybutene, containing 50% styrene and made at −103° F., were mixed at 100–150° F. on a mill using the following compounding formula:

|  | Parts |
|---|---|
| Polymer | 100 |
| Zinc oxide | 5 |
| Stearic acid | 1 |
| BRT #7 plasticizer[1] | 5 |
| Cabot #9 (easy processing channel black) | 50 |
| Altax (benzothiazyl disulfide) | 1 |
| Sulfur | 1.5 |

[1] Coal tar product containing naphthalene compounds.

For comparison, a similar batch was made except that the polymer consisted of 100 parts of the same GR-S rubber without any stybutene. In making the mixtures on the mill, it was noted that the time for incorporation of the compounding ingredients was about one-fourth to one-third less in the case of the batch containing the stybutene. Both batches were then cured for three different periods of time, and the vulcanized products were studied for stress-strain relationship, the result being given in the following table, which also shows the Williams Plasticity before and after mastication.

| Test No. | 1 | | | 2 | | |
|---|---|---|---|---|---|---|
| Percent Comp. of Polymer: | | | | | | |
| Synthetic Rubber | 100 | | | 90 | | |
| Stybutene | | | | 10 | | |
| Williams Plasticity: | | | | | | |
| As received— | | | | | | |
| 5 Kg. at 80° C | 99-0 | | | 104-6 | | |
| 10 Kg. at 80° C | | | | | | |
| Masticated— | | | | | | |
| 5 Kg. at 80° C | 84-5 | | | 93-1 | | |
| 10 Kg. at 80° C | | | | | | |
| Stress-Strain (at 292° F.): | | | | | | |
| Minutes cured | 25 | 50 | 90 | 25 | 50 | 90 |
| 100% | 48 | 99 | 150 | 48 | 141 | 191 |
| 200% | 79 | 248 | 417 | 95 | 262 | 443 |
| 300% | 144 | 460 | 770 | 143 | 490 | 831 |
| 400% | 187 | 764 | 1,218 | 209 | 755 | 1,243 |
| 500% | 257 | 1,090 | 1,683 | 282 | 1,038 | 1,648 |
| 600% | 338 | 1,435 | 2,230 | 376 | 1,338 | 2,143 |
| 700% | 396 | 1,805 | | 430 | 1,686 | 2,570 |
| 800% | 469 | | | 509 | | |
| 900% | 545 | | | 580 | | |
| 1,000% | | | | 604 | | |
| Tensile Strength (lbs./sq. in.) | 595 | 2,230 | 2,650 | 638 | 2,050 | 2,593 |
| Elongation (percent) | 1,000 | 800 | 673 | 1,013 | 786 | 703 |

It is evident from the above data that the cured properties of the GR-S synthetic rubber are not impaired by the presence of the stybutene.

*Example 13*

Example 12 was repeated except using a GR-A type of synthetic rubber instead of GR-S. The GR-A rubber used was made of 74% butadiene and 26% acrylonitrile. The Williams Plasticity and stress-strain data obtained were as follows:

| Test No. | 1 | | | 2 | | |
|---|---|---|---|---|---|---|
| Percent Comp. of Polymer: | | | | | | |
| Synthetic Rubber | 100 | | | 90 | | |
| Stybutene | | | | 10 | | |
| Williams Plasticity: | | | | | | |
| As received— | | | | | | |
| 5 Kg. at 80° C | 104-10 | | | 110-4 | | |
| 10 Kg. at 80° C | | | | | | |
| Masticated— | | | | | | |
| 5 Kg. at 80° C | 97-3 | | | 97-3 | | |
| 10 Kg. at 80° C | | | | | | |
| Stress-Strain (at 287° F.): | | | | | | |
| Minutes cured | 30 | 60 | 90 | 30 | 60 | 90 |
| 100% | 188 | 246 | 246 | 243 | 304 | 296 |
| 200% | 447 | 538 | 583 | 559 | 665 | 702 |
| 300% | 906 | 1,125 | 1,210 | 1,088 | 1,333 | 1,460 |
| 400% | 1,445 | 1,760 | 1,868 | 1,640 | 2,010 | 2,150 |
| 500% | 2,000 | 2,416 | 2,606 | 2,253 | 2,773 | 3,003 |
| 600% | 2,636 | 3,213 | 3,490 | 2,893 | 3,930 | |
| 700% | 3,336 | 4,000 | | 3,520 | | |
| 800% | | | | | | |
| Tensile Strength (lbs./sq. in.) | 3,913 | 4,040 | 4,163 | 3,580 | 3,610 | 3,436 |
| Elongation (Percent) | 763 | 700 | 683 | 696 | 610 | 560 |

These data also show no substantial impairment of the cured properties due to the presence of the stybutene.

It is not intended that this invention be limited to the specific materials which have been mentioned merely for the sake of illustration, but only by the appended claims in which it is intended to claim all novelty inherent in the invention, as well as all modifications coming within the scope and spirit of the invention.

What is claimed is:

1. A composition comprising essentially 90% by weight of a synthetic rubber made of 74% butadiene and 26% of acrylonitrile, having admixed therewith about 10% by weight of a styrene-isobutylene copolymer of 50% combined styrene and having an intrinsic viscosity of 0.6 to 3.0.

2. A composition comprising essentially about 80% by weight of a synthetic rubber made of 65% of butadiene and 35% of acrylonitrile, having admixed therewith about 20% by weight of a styrene-isobutylene copolymer of 60% combined styrene and having an intrinsic viscosity of 0.6 to 3.0.

3. A composition comprising about 80 to 90% by weight of a synthetic rubber copolymer containing 65 to 85% by weight of butadiene and 35 to 15% by weight of styrene, and admixed therewith about 10 to 20% by weight of a styrene-isobutylene copolymer having a combined styrene content of about 50 to 60% by weight, and having an intrinsic viscosity of about 0.6 to 3.0.

4. A composition consisting essentially of 80 to 90% by weight of a synthetic rubber copolymer of 65 to 85% by weight of butadiene and 15% to 35% of acrylonitrile, and admixed therewith about 10 to 20% by weight of a styrene-isobutylene copolymer having a combined styrene content of 50 to 60% by weight and having an intrinsic viscosity of about 0.6 to 3.0.

5. A composition consisting essentially of 80 to 90% by weight of a synthetic rubber copolymer containing 65 to 85% by weight of butadiene and 15 to 35% by weight of acrylonitrile, and admixed therewith 10 to 20% by weight of a styrene-isobutylene copolymer containing about 50 to 60% by weight of combined styrene, and having an intrinsic viscosity of about 0.7.

6. A composition comprising about 80 to 90% by weight of a synthetic diolefin rubber copolymer containing 65 to 85% of butadiene and about 15 to 35% of a material selected from the class consisting of styrene and acrylonitrile, and homogeneously admixed therewith about 10 to 20% by weight of a substantially saturated hydrocarbon copolymer of isobutylene and styrene, said saturated copolymer having an intrinsic viscosity of about 0.6 to 3.0 and having about 50 to 60% of combined styrene, and said saturated copolymer being compatible with said synthetic diolefin rubber.

7. A vulcanized composition according to claim 6.

8. A thin, flexible self-suporting film composed essentially of a composition as defined in claim 6.

9. A composition comprising essentially 90% by weight of a synthetic rubber made of about 75% by weight of butadiene and 25% by weight of styrene, having admixed therewith about 10% by weight of a styrene-isobutylene copolymer of about 50–60% combined styrene and having an intrinsic viscosity of 0.6 to 3.0.

MARVIN H. MAHAN.

REFERENCES CITED

The following references are of record in the file of this patent:

UNITED STATES PATENTS

| Number | Name | Date |
|---|---|---|
| 2,213,423 | Wiezevich | Sept. 3, 1940 |
| 2,274,749 | Smyers | Mar. 3, 1942 |
| 2,491,525 | Sparks et al. | Dec. 20, 1949 |
| 2,491,526 | Sparks et al. | Dec. 20, 1949 |

FOREIGN PATENTS

| Number | Country | Date |
|---|---|---|
| 513,521 | Great Britain | Oct. 16, 1939 |